Feb. 25, 1930.  M. B. WILDER  1,748,093
CLUTCH AND BRAKE BAND RELINING MACHINE
Filed Dec. 20, 1927  3 Sheets-Sheet 1

Inventor
M. B. WILDER.
By Arthur H. Sturges,
Attorney

Feb. 25, 1930.  M. B. WILDER  1,748,093
CLUTCH AND BRAKE BAND RELINING MACHINE
Filed Dec. 20, 1927  3 Sheets-Sheet 2
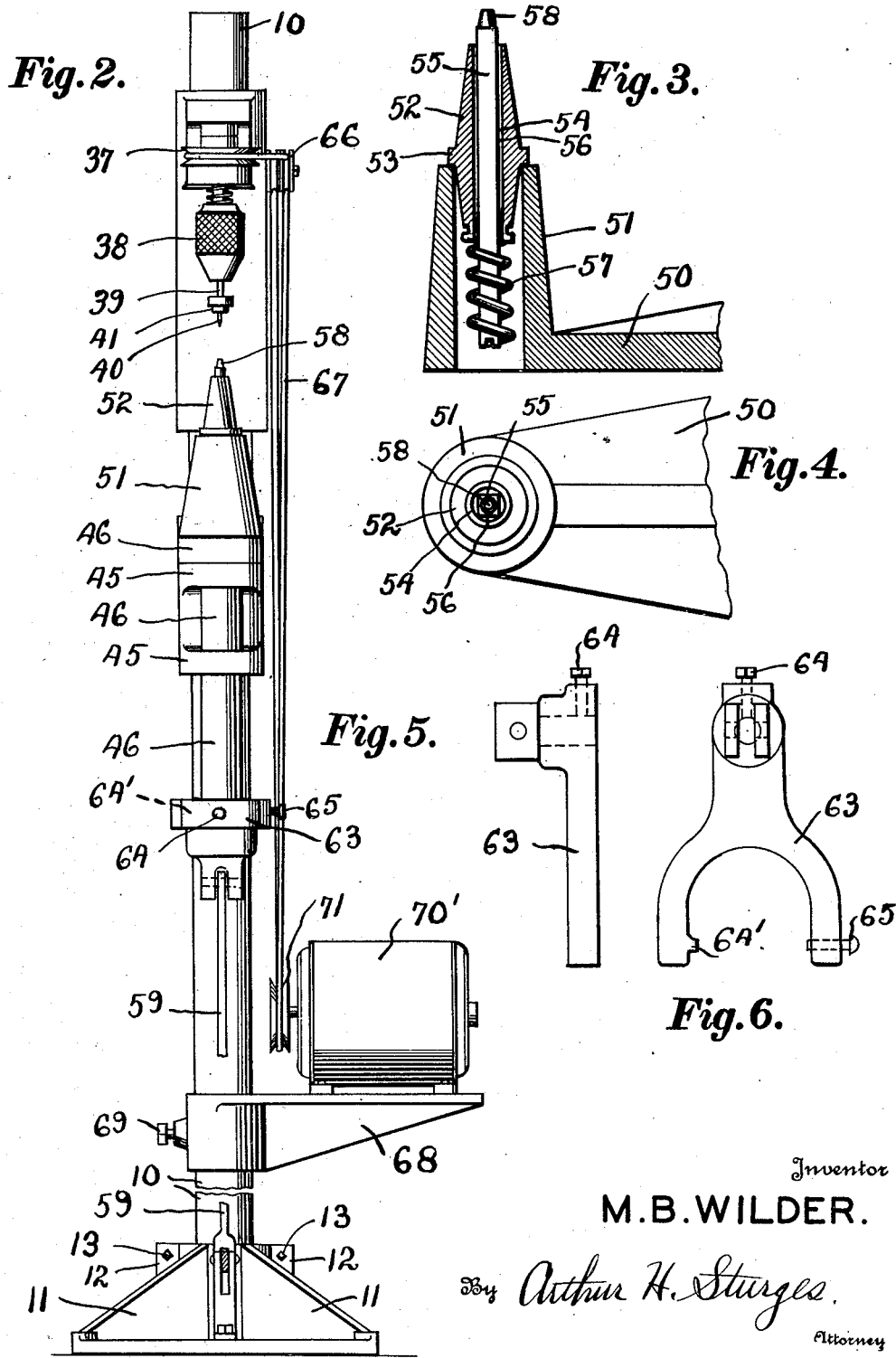
Inventor
M. B. WILDER.
By Arthur H. Sturges.
Attorney Feb. 25, 1930.  M. B. WILDER  1,748,093
CLUTCH AND BRAKE BAND RELINING MACHINE
Filed Dec. 20, 1927  3 Sheets-Sheet 3
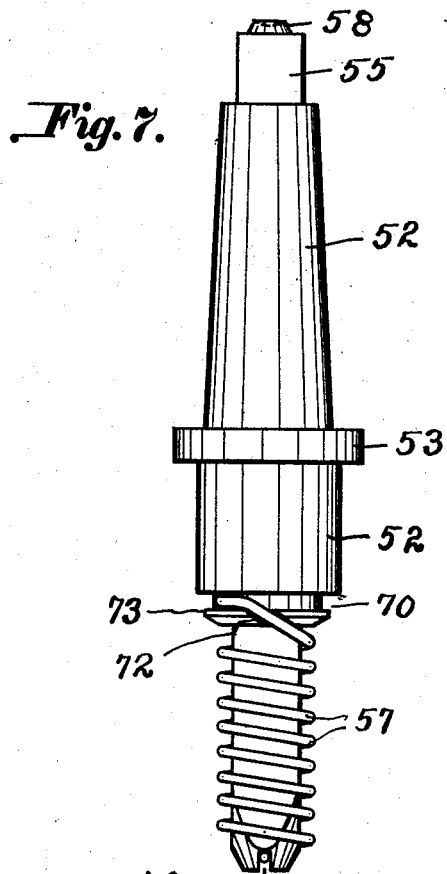
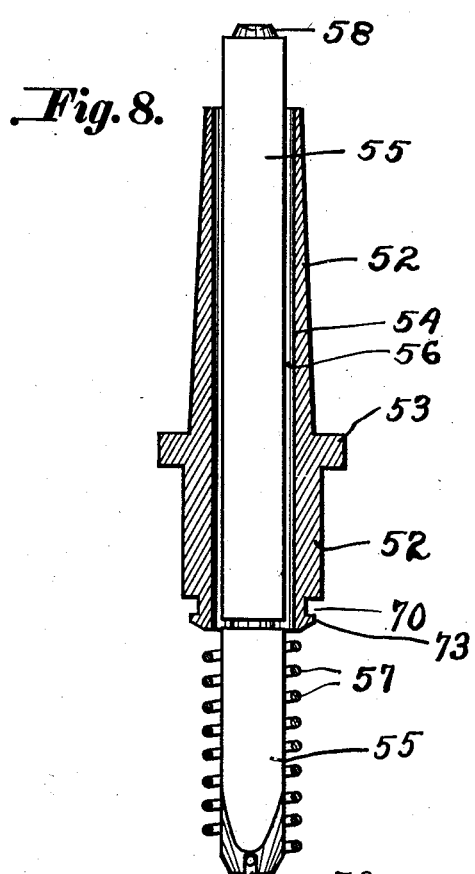
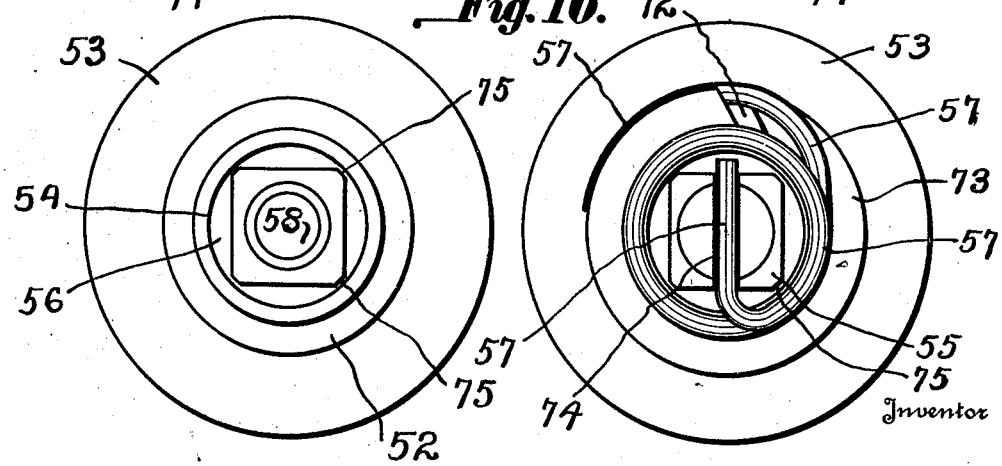
M.B. WILDER.
By Arthur H. Sturges,
Attorney Patented Feb. 25, 1930

1,748,093

UNITED STATES PATENT OFFICE

MORRIS B. WILDER, OF OMAHA, NEBRASKA

CLUTCH AND BRAKE-BAND RELINING MACHINE

Application filed December 20, 1927. Serial No. 241,298.

This invention relates to punching, boring and riveting machines and more particularly to a machine adapted for operation upon brake bands, clutches and the like requiring lining and relining.

The object of the present invention is to provide an improved machine of this type which may be used for re-riveting discs for multiple disc clutches, brake-bands, cone clutches and similar devices which embody the removal and replacement of rivets.

Another object of the invention is to provied a machine with a punching section for punching out old rivets from brake-bands and the like and which is provided with a boring section for accurately forming openings for the reception of rivets, the openings being formed in registry with the usual opening in a supporting structure, such as the cone shell, the brake-band and the like.

The invention still further aims at a machine which is provided with chucks or sockets adapted to receive punches and rivets interchangeably and of different types, so as to take care of all classes of work wherein rivets are to be removed and positioned and wherein new parts, such as linings, are adapted to be bored to receive rivets, and the bores are required to be in certain different places with respect to the openings in the supporting members.

An important feature of the present invention is to provide a machine with a supporting table or anvil arranged to receive work of different characters and at different angles, and which may be adjusted for positioning the anvil or center pin in position to project into the open side of a clutch cone of the like, or supporting the clutch cone and for determining the centering of the drill or punch over the selected opening in the cone shell.

The invention further embodies a novel construction for maintaining the belt tight which drives the drilling mechanism and without the addition of separate devices, such as springs, pulleys, levers, and the like to insure a positive and even drive of the drill shaft.

A further and very particular and important object of the invention is to provide a novel centering pin which by means of its shape is adapted to by-pass the drillings or chips of a brake band through its holder. The object being to prevent the vertically reciprocating centering pin from becoming clogged and sticking and thereby injuring the work, said pin being used in conjunction with a pilot or boring and countersinking tool which requires a free movement of said pin for accurately centering the work.

Another and very particular object is to provide an adjustable means whereby horizontal swinging of the centering pin are prevented.

With the foregoing and other objects in view, the invention will be more fully described hereinafter, and will be more particularly pointed out in the claims appended hereto.

In the drawings, wherein like symbols refer to like or corresponding parts throughout the several views:

Fig. 2 is an edge view of the machine looking toward the drilling mechanism and showing the supports for the motor drive, or driving motor.

Fig. 3 is a longitudinal section through a novel by-passing pilot mounted in a hub or holder, the holders are broken away.

Fig. 4 is a top plan view of the device shown in Fig. 3.

Fig. 5 is a side view of a fork guide employed.

Fig. 6 is a top plan view of the members shown in Fig. 5.

Figure 7 is a side elevation of the preferred modified embodiment of the pilot member shown in Figure 3.

Fig. 8 is a longitudinal section of the same.

Fig. 9 is a top plan view, on an enlarged scale, of the device shown in Figure 7, and Fig. 10 is a bottom plan view of the same.

Figure 1:
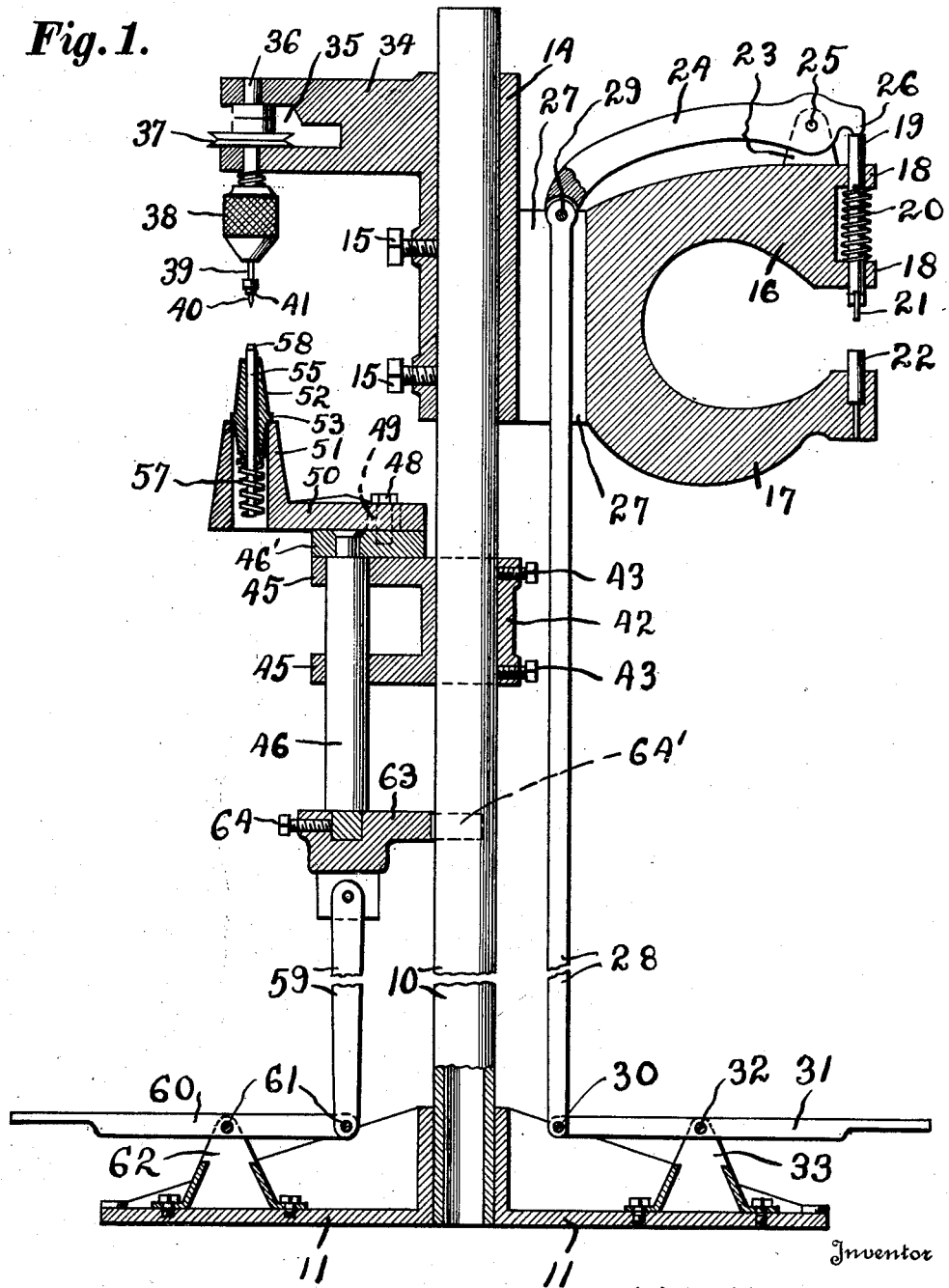
Fig. 1 is a vertical central section taken through the machine substantially in the plane of the opposed operating parts.

Referring now to the drawings, and particularly to Figs. 1 and 2, 10 designates a standard which may be of tubular construction and which is secured between a pair of base sections 11 at its lower end and held in upright position thereby.

The base sections 11 have at their intermeeting ends outwardly extending flanges 12 adapted to abut at opposite sides of the standard and to be clamped together by bolts 13 or the like. Upon the upper portion of the standard 10 is a head casting preferably in one piece and which comprises an intermediate sleeve 14 slidable upon the standard 10 and of appreciable length to obtain suitable purchase upon the standard. The sleeve 14 is secured at a suitable angle and at a suitable height relatively to the standard 10 by means of rivets or pins or keepers 15 which are threaded in the sleeves 14 and which bind against the standard 10. The head casting also embraces a lateral projection from the sleeve 14 in the form of vertically spaced apart jaws 16, and 17. The jaws 16, is the upper jaw and is provided at its other end with vertically spaced projecting lugs 18, having alining openings therethrough for the reception of a shaft 19 arranged to slide vertically through the lug 18 and which is normally maintained raised by a spring 20 interposed between the lugs 18 and surrounding the shaft 19. The shaft 19 may have a pin through its upper end portion at the top of the spring 20 against which the latter may work to urge the shaft 19 upwardly. The lower end of the shaft 19 is socketed for the reception of a punch 21 such as shown in Fig. 1 for flattening the heads of rivets.

The lower jaw 17 is provided with a socket in its outer end which registers with the openings in the lugs 18 and which is adapted to support an anvil 22 of any suitable type, for holding the work beneath the punch 21 as the latter is forced downwardly to flatten a rivet or to remove a worn rivet. The anvil 22 may be provided with projections upon its upper end arranged in concentric or other suitable order for causing the rivet to spread in flattening, and preferably one of the projections is arranged centrally of the anvil in order to center the rivet upon the base of the anvil and beneath the impact die or punch.

These anvils heretofore mentioned may be interchanged or substituted one for the other in the socket of the jaw 17 according to the character of the work which is to be done.

The upper jaw 16 of the punching mechanism is provided with a pair of upstanding ears 23 between which is pivoted a lever 24 by means of a transverse pin 25 and the lever 24 has a nose 26 which engages the upper end of the shaft 19. The long arm of the lever 24 extends inwardly over the upper edge of the arm 16 and terminates above an elongated slot 27 which is formed in the head casting at the adjacent side of the sleeve 14. A connecting rod 28 is pivoted at 29 to the inner end of the lever 24 and extends downwardly through the slot 27 to the rear end pivot 30 of a treadle 31, the treadle 31 is pivoted at 32 upon the upper end of a base bracket 33 which rises from the adjacent base section 11, and the treadle 31 extends outwardly from the standard 10 a suitable distance for receiving the foot of the operator thereon. The head casting is provided at the opposite side of the sleeve 14, and preferably at a point above the punching arms 16 and 17, with an outwardly extending bracket 34 which is preferably integral with the sleeve 14 and which is provided with a horizontal recess 35 in its outer end providing upper and lower bracket portions with aligning openings therein to support a drill shaft 36. The drill shaft 36 carries a pulley 37 which is arranged in the bracket 34 between the spaced portions thereof. The lower end of the shaft 36 carries a chuck 38 adapted to carry a cutter 39 of any approved type. The cutter 39 is provided with a drill point 40 of the general size of the opening into which a rivet is expected to be placed, and has a square shouldered cutting portion 41 adapted to countersink the work with an enlarged countersink or cylindrical portion so as to form an opening arranged to accommodate a rivet or the like.

Various types of the cutters and drills 39 may be employed for doing various work.

For the purpose of supporting work beneath the drill chuck 38, the lower sleeve 42 is mounted on the standard 10 and secured thereto by means of bolts 43 or rivets may be employed. The sleeve 42 carries a pair of outwardly projecting arms 45 through which is slidably fitted a shaft 46 secured at its upper end upon a block 46' adapted to fit upon the upper arm 45 of the lower sleeve. The block 46' is provided with a pair of bolts 48 or similar means and which engage through elongated slots 49 formed in the inner end portion of a work table or bracket 50 which is adapted to extend outwardly from the standard 10 to a considerable extent, and which has upon its outer end an upstanding hub-portion 51. Within the hub-portion 51 is fitted a removable sleeve 52.

The removable sleeve 52 is provided with an annular flange 53 which as shown in Figs. 3 and 4 is adapted to rest upon and seat against the upper edge of the hub-portion 51. As shown particularly in Fig. 4, the sleeve 52 is provided with a central bore 54 and carries a centering pin 55 which as clearly shown in Fig. 4 is rectangular or square in cross section thus providing four segmental apertures which extend through the sleeve 52. These recesses 56 are adapted to permit drillings and shavings from the brake bands to pass therethrough as later described.

The lower end of the centering pin 55 is connected with a spring 57 the lower end of said spring being attached to the pin 55, the upper end of the spring 57 being attached to the member 52. By this means it will be noted that the pin 55 is maintained at a normal position with its point or end 58 above the upper, or top end of the sleeve 52, and when the pin 55 is depressed by means later described and when such pressure is removed the spring 57 will automatically return the pin 55 to the normal position as shown in Fig. 3. By this means it will be noted that pin 55 is normally urged upward through the removable sleeve 52 until the spring 57 becomes retracted.

The lower end of the shaft 46 is connected by a link 59 to a treadle 60 pivoted at 61 upon the upper end of a base bracket 62 which rises from the opposite base section 11. The treadle 60 extends outwardly to a distance sufficient to be engaged by the foot of the operator. The shaft 46 and the table 50 carried thereby are held from turning in the arms 45 by a bifurcated guide 63 which is permanently riveted to the shaft 46 by means of rivets or keepers 64 and the forked or bifurcated portion of the guide 63 engages the opposite sides of the standard 10 to hold the guide and its parts from turning.

Referring particularly to Fig. 6 the guide 63 is provided upon one of its forks with a lug 64' and the fork upon the side opposite to the member 64 is provided with an adjustable set screw 65 which may be rotated to take up wear and thus secure an accurate fit between the lugs 64' and the set screw 65 for fitting therebetween the tubular standard 10.

For driving the drill shaft 36 the sleeve 14 may be provided at one side with a pair of idler pulleys 66 with their upper sides tangential to the horizontal plane of the pulley 37 and adapted to receive the opposite runs of a belt or cord 67 which is turned about the pulley 37 and which is carried downwardly at the side of the standard 10 to a convenient position near the lower end thereof. The standard 10 carries a motor bracket 68 adjustably fixed in place by a set screw 69 for carrying a motor 70'. The motor has a pulley 71 about which the lower end of the cord 67 is looped. Tension on the cord 67 may be varied by raising and lowering the motor bracket 68.

In operation, when it is desired to reline a brake band, it is only necessary to place the brake band upon the anvil 22 with the worn rivet on the anvil and beneath the punch 21. The operator now forces the outer end of the treadle 31 downwardly and moves the connecting rod 28 upwardly so as to swing the lever 24 in a direction to force the shaft 19 in a downward direction. The old rivet is thus ejected from the brake band and repeated operations remove all of the rivets and the worn lining. The new lining is now placed in proper position upon the brake band and said band is placed upon the centering pin 55 with said centering pin projecting into a selected opening of the brake band. This determines the correct position of the lining beneath the drill point 40 so that when the work table 50 is elevated by the treadle 60, the point 40 will be caused to operate in true axial alignment with the opening in the brake band. It will be noted that the centering pin 55 registered with the opening in the drill point 40 and determines the correct position of the lining above the opening in the brake band.

It may be seen that the machine is adapted for all kinds of brake bands, clutch lining and relining or resurfacing work, and that old rivets and parts may be readily removed as well as new parts quickly replaced. After the drilling operation, the work is then passed to the opposite side of the machine and rivets of various types (not shown) are inserted in their respective openings and the work is then placed upon the anvil 22, or other types of anvils than that shown may be employed. During this last mentioned operation the punch 21 may be replaced by a rivet flattening punch or member (not shown) and by means of this substitution various types of work may be advantageously accomplished.

As last described the punching mechanism may be employed by the substitution of the parts mentioned to operate to swage or spread the rivet heads and thus secure the surfacing material to the shell body. It will be understood from the foregoing description that since brake bands are of semi-fibrous material that during the drilling operation the cuttings or abrasions from the brake band caused or formed by the cutting point 40 will fall downwardly upon the pin 55, and as heretofore practiced where a round pin 55 employed in an annular or round recess, that shavings or drillings, or cuttings would clog the pin 55 which would thus not be freely moveable. As thus described, it will be obvious that the pin 55 would not function to center the work since it would at times become fastened to the bore, but by means of the present construction, namely by means of providing the recesses 56 and the angularly shaped pin 55 the shavings above mentioned are free to pass through the recesses 56 and drop downwardly, thus insuring the free movement of the pin 55 at all times.

As shown in Figs. 8, 9 and 10 the centering pin 55 is seated within the bore 54 of the sleeve 52. The sleeve 52 is provided with a flange 53 which may rest upon the top of the hub portion 51 of work table of bracket 50.

The lower end of the sleeve 52 is provided with an annular recess 70. As shown in Fig. 7, the lower flange 73 which forms a side wall of the recess 70 is provided with a cut-away portion 72, said cut-away portion being inclined at an angle of substantially thirty degrees. Through the cut-away portion 72 the spring 57 is adapted to be passed, and its top end is adapted to be secured in the recess 70.

The lower end of the spring 57 is adapted to be received in slot 74. The transverse slot 74 as shown in Fig. 10 is adapted to hold the spring 57 attached therein. By this means when pressure is placed on the pin 55 and the spring 57 becomes extended, when the pressure is removed the spring 57 will return the pin 55 to an upward normal position.

As shown in Figs. 7 and 10 inclusive the spring 57 is a left-hand spring, and since the drill 40 turns in a clockwise direction the tendency of the movement is to screw the spring 57 tightly into the annular recess 70. It will be noted that should the pin require removal for cleaning that the operator may manually turn the pin 55 in a counter clockwise direction and thereby detach the spring 57 from the recess 70 and remove the pin for cleaning the same.

As shown particularly in Figs. 10 and 9, the pin 55 is provided with comparatively sharp edges 75. As heretofore explained, the drill 40 when it makes contact with the top of the pin at 58, will turn said pin partially around, and the sharp edge 75 of the pin will cut or scrape the greasy cuttings of the brake band lining free from the walls of the bore 55. When the pressure is released the spring 57 will return the pin to a normal position. By this means intermittent scraping of the bore 54 is provided so that the greasy shavings will fall downward through the elongated opening 55. The last described operation is very important since some brake linings are comparatively greasy and the tendency of the material which is cut or bored away is to stick and clog the desired free vertical movements of the pin 55.

It will be noted that by means of the adjustable lug 64' and set screw 65 upon the fork guide member 63, that the pin 55 will at all times accurately register with the drill point 40. This last mentioned feature is very important since accurate drilling requires accurate alignment between the drill 40 and the pin 55.

I do not wish to be restricted to the size, form, and proportion of the various parts, and obviously changes could be made in the construction herein described without departing from the spirit of the invention, it being only necessary that such changes fall within the scope of the appended claims:

I claim:—

1. In a machine of the character described, a standard, a head casting adjustably mounted on the standard, punching means at one side of the head casting for removing old rivets and upsetting new rivets, drilling means carried upon the opposite side of said head casting arranged to drill holes in new work for rivets, foot operated means for supporting work beneath said drilling mechanism, bore centering means carried by the foot operated means for indicating the position of superposed positions of work to aline openings therein during the drilling operation, sliding guide means upon the standard for said bore centering means and carried by said foot operated means, and means carried by said guide means for making adjustments of said guide means transversely of said standard.

2. In a removable pilot for a boring machine provided with a drill, a hub provided with a central bore, a transversely angular pilot pin within said bore, a spring for returning said pin to a normal position with respect to said hub, an annular recess upon said hub for receiving an end portion of said spring, a flange on said hub for removably securing said spring to said hub, a notch in said flange for by-passing said spring, the coils of said spring being in a reversed direction to the rotation of said drill whereby upon contact between said drill and said pin binding engagement will be caused between said spring and said hub.

3. In a pilot for a boring machine, a sleeve having a cylindrical bore therethrough, a pilot pin in the bore and being substantially angular in cross section to provide longitudinal edge portions bearing on the wall of said bore at spaced points and having relatively flat faces between the edge portions providing passages about the pin for by-passing drillings, said edge portions adapted to scrape the wall of said bore.

In testimony whereof, I have affixed my signature.

MORRIS B. WILDER.